March 7, 1944.  C. T. GALLOWAY  2,343,407
MACHINE FOR CHAMFERING GEARS
Filed March 16, 1940  7 Sheets-Sheet 3

Inventor
CLARENCE T. GALLOWAY
By B. E. Schlesinger
Attorney

Fig. 7

March 7, 1944.  C. T. GALLOWAY  2,343,407

MACHINE FOR CHAMFERING GEARS

Filed March 16, 1940  7 Sheets-Sheet 5

Inventor
CLARENCE T. GALLOWAY

By B. F. Schlesinger
Attorney

Fig. 16

Inventor
CLARENCE T. GALLOWAY

Patented Mar. 7, 1944

2,343,407

UNITED STATES PATENT OFFICE 2,343,407

MACHINE FOR CHAMFERING GEARS

Clarence T. Galloway, Rochester, N. Y., assignor to Gleason Works, Rochester, N. Y., a corporation of New York Application March 16, 1940, Serial No. 324,347

17 Claims. (Cl. 90—1.4)

The present invention relates to machines for chamfering gears and particularly to machines for chamfering straight bevel gears.

One object of the invention is to provide a chamfering machine which will be relatively simple in construction but extremely fast in operation. To this end, a further purpose of the invention is to provide a machine on which all of the teeth of a gear may be chamfered simultaneously by a single stroke of the work relative to the chamfering tool or tools.

Another object of the invention is to provide a chamfering machine having means for automatically feeding gears successively to operative position so that the chamfering operation may proceed with maximum efficiency and least possible lost time. To this end, it is also an object of the invention to provide a machine having a turret for carrying a plurality of gears, which may be rotated step by step to bring a new gear into operative position after each chamfering stroke.

Still another object of the invention is to provide a machine having means for indexing the work supporting turret automatically in time with the mechanism for effecting the chamfering operation so that chamfering and indexing may proceed in proper sequence without danger of damage to the work or to the chamfering tools.

A still further object of the invention is to provide a hydraulically operated chamfering machine in which the mechanism for rotating the work supporting turret and the mechanism for effecting the chamfering operation are interlocked.

Other objects of the invention will be apparent hereinafter from the specification and from the recital of the appended claims when taken in conjunction with the accompanying drawings.

The chamfering tool employed with the present invention has a plurality of internally projecting blades or teeth equal in number to the tooth spaces of the straight bevel gear to be chamfered. The blades or teeth of the chamfering tool are provided with side cutting edges and preferably with top cutting edges also. The opposite side cutting edges are shaped to be substantially complementary to the opposite sides of the teeth of the gear at the end of the teeth which is to be chamfered. The tool, in other words, has the general form of an internal gear which is axially coincident with the gear to be chamfered and which is complementary to the gear at one end thereof.

The chamfering operation is effected by passing the work through the chamfering tool. The side cutting edges of each chamfering blade thus chamber opposite sides of a tooth space of the gear and the top cuting edge of a blade chamfers the bottoms of the tooth space. The chamfering cut is taken preferably toward the small end of the gear. The chamfering blades accordingly clear themselves, after taking their chamfering cuts, because of the taper of the gear.

In the machine illustrated in the drawings, the chamfering tool is fixedly mounted in the base or frame of the machine. The gears which are to be chamfered are placed by the operator on a rotary table or turret that is provided with a plurality of equi-spaced work-receiving openings. There is a gauge or finger associated with each opening and this finger is adapted to enter a tooth space of the gear to roughly position the work angularly in the opening. The turret is indexed intermittently to bring successive work pieces successively to the cutting station. The chamfering tool is mounted below the plane of rotation of the turret and so positioned that when a work piece is at the cutting station, the work will be above and in axial alignment with the tool.

At the cutting station there are two rams mounted in axial alignment with one another and with the cutting tool. The lower ram is adapted to pass up through the chamfering tool so that its upper end may form a seat on which each work piece may rest when it reaches the cutting station. The upper ram carries at its lower end a center and a beveled gauging finger. The center is adapted to enter the bore of the gear, which is at the cutting station, when the ram is lowered, and the gauge finger is adapted to enter a tooth space of this gear to position the gear precisely angularly so that its tooth spaces will be in register with the cutting teeth or blades of the tool.

The two rams are actuated hydraulically. When a work piece reaches the cutting station, both rams are in their upper positions. When indexing of the turret has been completed and the gear that is to be chamfered is above the cutting tool, the upper ram is lowered. This causes the center to enter the bore of the gear and the gauge finger to enter a tooth space of the gear to bring the tooth spaces of the gear into accurate alignment with the teeth of the chamfering tool. As the upper ram continues its downward movement, the gear is clamped between the upper and lower rams. The continuous pressure on the upper ram then forces the lower ram downwardly also, causing the gear to be forced downwardly through the blades of the fixed chamfering tool, thus causing the sides and bottoms of its teeth to be chamfered at one end.

When the chamfering has been completed, the lower ram will be moved on downwardly away from the upper ram by fluid pressure, causing the gear, which has been chamfered, to be stripped off of it by a series of fingers and deflected into a chute which carries it away. The rams are then returned to their upper positions and the work table is indexed to bring another gear to cutting position. The cycle then begins anew.

On each downward stroke of the rams, a gear is chamfered and discharged from the machine. At the end of the return strokes, a new gear is brought into position to be chamfered. All that the operator is required to do is to keep putting gears on the work table at the loading station.

Figure 1:
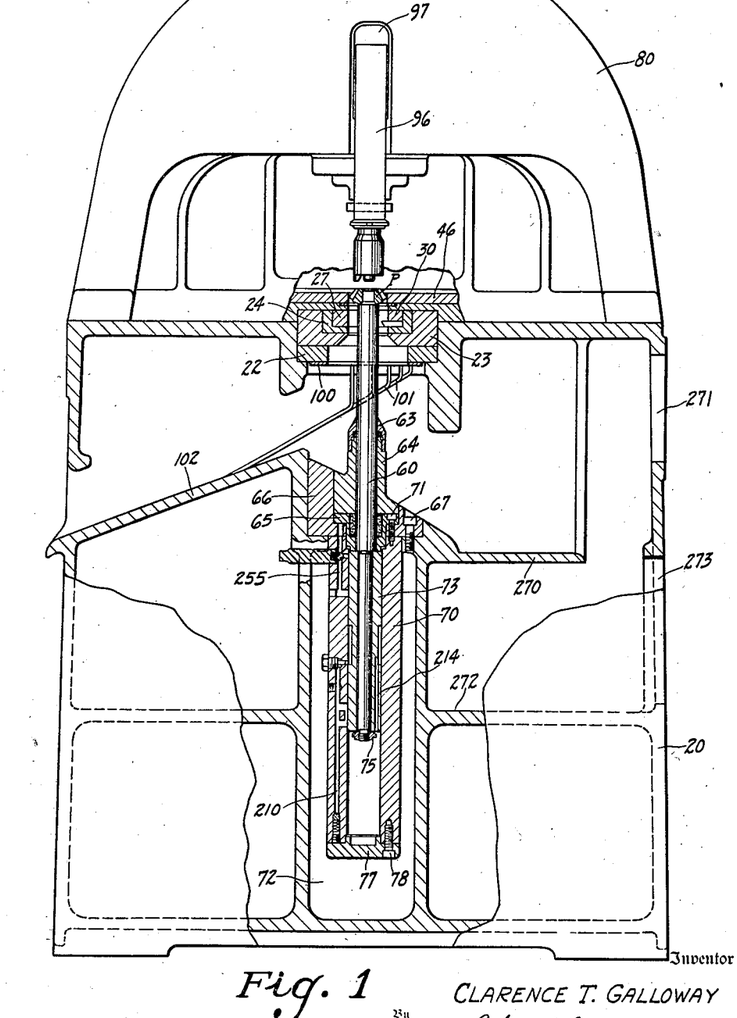
Fig. 1 is a front elevation, with parts broken away, of a chamfering machine constructed according to a preferred embodiment of this invention.
Figure 2:
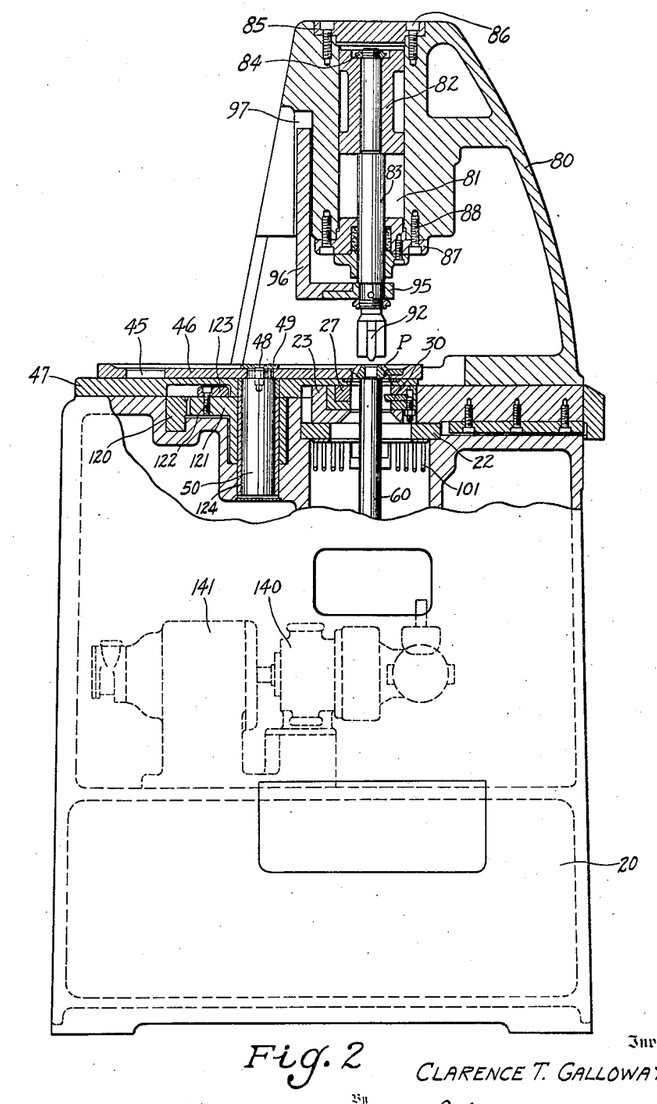
Fig. 2 is a side elevation of this machine, parts being broken away.
Figure 4:
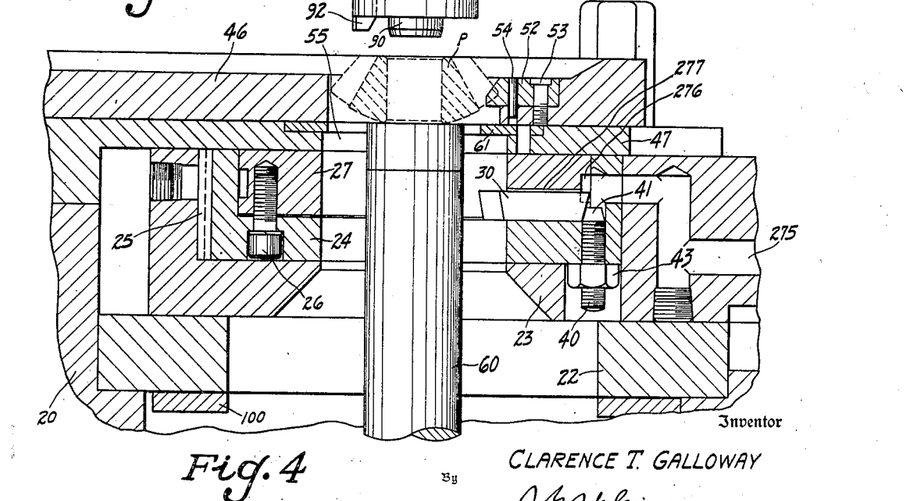
Fig. 4 is a fragmentary vertical sectional view on a still further enlarged scale showing the tool support and associated parts and the lower end of the upper ram.

Reference will now be had to the drawings for a more detailed description of the invention. 20 denotes the base of the machine. The upper face of this base is formed with a central recess or depression which is adapted to receive a hardened plate or rest 22 (Figs. 1, 2 and 4). On this plate or rest 22 there is mounted a seat member 23 which is secured in any suitable manner to the plate 22 against movement relative thereto. The seat member 23 is recessed to receive the tool head 24 which is keyed to the seat member 23 by a key 25 that holds the tool head 24 against rotation relative to the seat member and locates the tool angularly on the seat member. Secured to the tool head by screws 26 is a tool block 27. The tool block 27 is provided on its under face with a plurality of radially disposed recesses in which are mounted the chamfering blades 30 (Figs. 3, 4 and 6).

The chamfering blades are adapted to rest upon the upper face of the tool head 24 and when the screws 26 are tightened up are clamped between the tool block 27 and the head 24 so as to be rigidly held in place. The plate 22, seat member 23, head 24, and block 27 are provided with aligned bores so that the upper and lower rams can pass through them as will be described more fully hereinafter.

Figure 6:
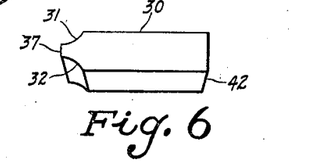
Fig. 6 is a perspective view of one of the chamfering blades.

The machine illustrated in the drawings is arranged to chamfer the large ends of the teeth of straight bevel pinions P. The chamfering blades 30 are therefore provided with opposite side cutting edges 31 and 32 (Fig. 6) which are complementary in profile shape to the profiles of opposite sides 33 and 34, respectively, of the teeth 35 of the pinion at the large end of the teeth. The chamfering blades may also be provided, as shown, with tip cutting edges 37 for chamfering the bottom lands 38 of the pinion at the large ends thereof.

Figure 3:
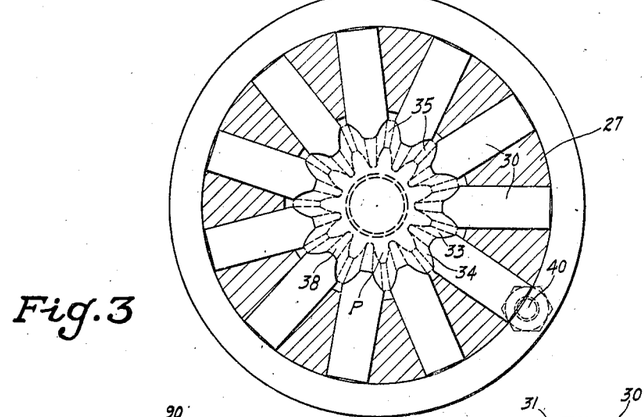
Fig. 3 is a plan sectional view on a somewhat enlarged scale of the chamfering tools and tool holder, and showing diagrammatically the relation of the tools to a bevel gear which is to be chamfered.

The chamfering blades are preferably relieved on their sides and tips back of their upper or front faces. Thereby, the blades need only be sharpened on their front faces, when they become dull, and the profile shapes of the blades will be retained throughout their useful life. After sharpening, of course, the blades are adjusted radially inwardly to compensate for their change in height due to sharpening. For the purpose of this inward radial adjustment, adjusting screws 40 may be provided. These screws thread into the tool head 24 and have conical upper ends which are adapted to engage against the beveled rear faces 42 of the chamfering blades. There is one adjusting screw 40 provided for each blade, although for the sake of simplicity only one screw is shown in Fig. 3 of the drawings. The screws are held in any adjusted position by lock-nuts 43.

Figure 7:
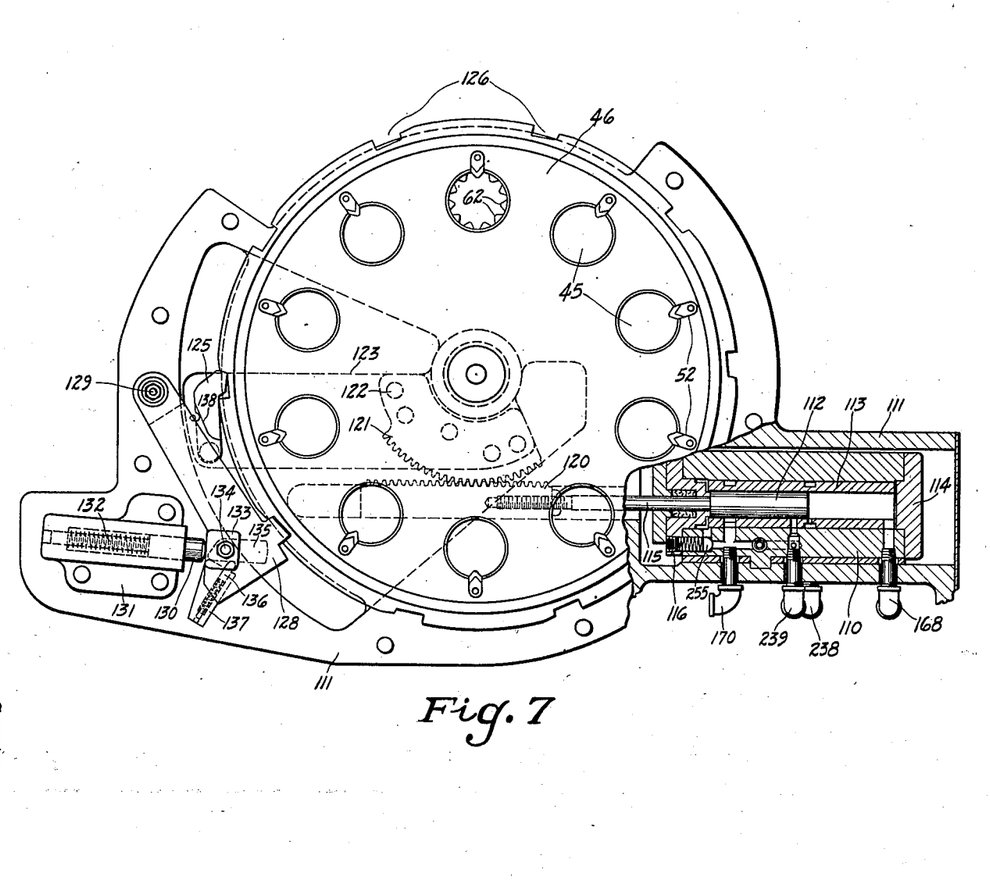
Fig. 7 is a plan view of the work supporting turret and showing, broken away, part of the mechanism for actuating the same.

The pinions, which are to be chamfered, are placed by the operator of the machine in openings 45 that are provided in a rotary table or turret 46 (Figs. 2 and 7). The openings 45 are equi-spaced from one another angularly about the axis of the table or turret and are of a dimension to readily receive the pinions. The pinions, when placed in the openings, rest on the upper face of a plate 47 which is secured to the upper face of the base 20 of the machine beneath the table or turret. The table is secured by a screw 48 and a washer 49 to a shaft 50 which is suitably journaled in the base of the machine. The table is adapted to be rotated intermittently by index mechanism, which will be described later, so as to move each pinion step by step from loading position to cutting position where it will register with the chamfering tool.

There is a gauge finger 52 (Figs. 4 and 7) secured at one side of each opening 45 of the turret 46. These gauge fingers are secured to the table or turret 46 by screws 53 and dowel-pins 54. The gauge fingers have tapered and beveled inner ends and each is adapted to enter a tooth space of a pinion which is placed in an opening 45 to roughly locate the pinion angularly in that opening.

As the turret is indexed around, the pinions are carried from the loading station to the cutting station, sliding over the top of the plate 47. The plate 47 is provided, however, with an opening 55 (Fig. 4) that registers with the bores of the plate 22, seat member 23, tool head 24 and tool block 27. This opening is larger in diameter than the diameter of the pinions P to be chamfered so that when each pinion arrives at the cutting station, it no longer rests on the plate 27. It is then adapted to rest instead upon the upper end of a piston rod or ram 60, which is adapted to pass up through these bores. To prevent a pinion from cocking, however, as the table 46 in its rotation slides the pinion over the opening 55, a thin plate 61 (Fig. 4) may be secured in the opening 55. This plate 61 has internal teeth 62 (Fig. 7) roughly conforming to the shape of the tooth spaces of the pinions which are to be chamfered.

The piston rod or ram 60 (Fig. 1) is adapted to slide through aligned openings formed in a beveled nose 63, a guide member 64, and stuffing-box 65. The nose 63 is secured in any suitable manner to the guide member 64 and the guide member 64 is secured in any suitable manner to a head 66. The head 66 is secured by screws 67 to the base 20 of the machine. The stuffing-box 65 closes the upper end of a cylinder 70 and is secured to the head 66 and cylinder 70 by screws 71. The cylinder is mounted in a central bore or opening 72 formed in the base 20.

The piston rod or ram 60 is secured to a piston 73 that is adapted to reciprocate in the cylinder 70. The piston 73 is secured against a shoulder, which is formed on the piston rod, by a nut 75 which threads onto the lower end of the piston rod. The lower end of the cylinder 70 is closed by an end plate 77 which is secured in position by screws 78.

The ram or piston rod 60, as already stated, is adapted to pass upwardly between the chamfering blades 30, through the aligned bores of the plate 22, seat member 23, head 24, block 27, and plate 61 so that its upper end may form a rest for the pinion which is to be chamfered.

There is a column or upright 80 secured in any suitable manner to the upper face of the base 20. This column or upright is bored to form a cylinder 81 which is in axial alignment with the cylinder 70. A piston 82 is mounted in this cylinder to reciprocate therein and a piston rod or ram 83 is secured to this piston by a nut 84 which threads onto the upper end of the piston rod. The upper end of the cylinder 81 is closed by an end plate 85 which is secured to the column 80 by screws 86. The piston rod or ram 83 passes through a stuffing-box 87 which closes the lower end of the cylinder 81 and which is secured to the column 80 by screws 88.

Figure 5:
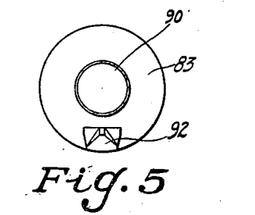
Fig. 5 is a bottom plan view of the upper ram.

The lower end of the piston rod or ram 83 is formed with a reduced portion 90 (Figs. 4 and 5) which serves as a center and is adapted to enter the bore of a pinion which is to be chamfered to center that pinion. There is a gauge finger 92 secured by a screw 93 and a dowel pin 94 (Fig. 4) in a recess formed in one side of the ram 83. The lower end of this finger 92 is adapted to project beyond the end of the ram 83 so as to enter a tooth space of the pinion which is to be chamfered. The finger 92 has beveled sides so that it will readily enter a tooth space of a pinion. It is secured to the piston rod 83 in a definite angular relationship to the chamfering blades 30 so that when the finger 92 enters a tooth space of a pinion P, that tooth space will be accurately aligned with one of the chamfering blades 30 and thereby all of the tooth spaces of the pinion will be aligned with the several chamfering blades.

To guide the piston rod or ram 83 in its movement there is a collar 95 secured to the projecting portion of the rod. This collar is secured in any suitable manner to an L-shaped arm 96. This arm is adapted to slide in an elongated guideway 97 that is formed in the front face of the column 80.

Secured to the under face of the plate 22 is a plate 100 that carries a plurality of deflectors or fingers 101 (Figs. 1 and 2). In the chamfering operation, a pinion P is moved downwardly through the chamfering blades 30 by downward movement of the rams 83 and 60, as will be described in more detail later, and the chamfered pinion is carried on downwardly until it strikes the fingers or deflectors 101. These serve to strip the pinion from the ram 60 and deflect in onto a chute 102 down which it may slide into a suitable receptacle (not shown) placed at one side of the machine.

The ram 83 is moved upwardly again after the chamfering stroke until it clears the table 46. The table is then indexed to bring another pinion into position to be chamfered.

The table index mechanism is also hydraulically actuated. A cylinder 110 (Fig. 7) is secured in a suitable bracket 111 that may be fastened to or be integral with the base of the machine. A piston 112 is mounted to reciprocate in a sleeve 113 which has a pressed fit in this cylinder. One end wall of the cylinder is closed by an end plate 114. The rod 115, which is integral with the piston 112, projects through a stuffing-box 116 which closes the opposite end wall of the cylinder. The projecting end of the piston rod 115 has a threaded connection with a rack 120 (Figs. 7 and 2) which slides in a suitable guideway formed in the base of the machine.

This rack 120 meshes with a spur gear segment 121 which is rotatably mounted on the same bushing 124 in which the shaft 50 is journaled. Fastened to the segment 121 by screws 122 is an arm 123 and pivotally mounted on the outer end of this arm is a pawl 125.

The table 46 is formed on its periphery with a plurality of equi-spaced notches 126 which are adapted to be engaged successively by the pawl 125. There is one notch for each work-receiving opening 45 in the table. During chamfering, the piston 112 is in the position shown in Fig. 7 and the table 46 is locked against rotation by a lock-dog 128 which is also adapted to be engaged successively with the notches 126 of the table. The lock-dog 128 is pivotally mounted at 129 in the bracket 111. It is normally held in locking position by a spring pressed plunger 130 which slides in a lug 131 that is secured to the bracket 111. A coil spring 132 which is housed in this lug and which surrounds the plunger serves to urge the plunger normally outwardly to hold the lock-dog 128 in locking position. The plunger engages with a lug 133 formed integral with the lock-dog.

Pivotally mounted on the lock-dog 128 by means of a pin 134 is a trip dog 135. This trip dog is normally urged in a counter-clockwise direction about its pivot pin 134 by a spring pressed plunger 136 which is housed in a block 137 formed integral with the lock-dog 128. The counter-clockwise movement of the trip dog 135 is limited, however, by engagement of the tail of this dog with the block 137. The pawl 125 is formed with an integral cam surface 138.

To effect indexing of the work table 46, the index mechanism is first reset. This is effected by moving the piston 112 to the right from the position shown in Fig. 7. On this movement, the arm 123 is rotated counterclockwise by the rack 120 and segment 121 and the pawl 125 ratchets out of that notch 126 of the table 46 with which it has been in engagement and is carried on beyond the notch 126 of the table with which the locking dog 128 is in engagement. The table 46 is held against rotation, however, during this movement, by the lock-dog 128. As the piston 112 moves on to the right, the cam portion 138 of the pawl 125 comes into engagement with the trip-dog 135 but merely rocks this trip dog in a clockwise direction about its pivot pin 134 against the resistance of the spring pressed plunger 136.

The indexing operation is effected on the reverse movement of the piston 112, that is, on movement of the piston to the left again. In this movement the arm 123 is moved in a clockwise direction. The cam portion 138 of the pawl 125 again engages the trip-dog 135, but the trip-dog is now held against rotation by abutment of its tail against the lug 137. Thus the locking-dog 128 is caused to be lifted out of locking engagement with the table 46. The pawl 125 then drops into that notch of the table with which the locking dog has previously been engaged. On the further leftward movement of the piston 112, then, the pawl 125 will rotate the table 46 and index the same.

As the cam portion 138 of the pawl 125 rides clear of the trip dog 135, the locking dog 128 will drop back onto the periphery of the table under actuation of the plunger 130. When the table has been indexed far enough for the next notch 126 of the table to register with the locking dog 128, the locking dog will drop into this notch and lock the table up again against rotation. The indexing of the table will thus have been completed and a new pinion brought into chamfering position.

To prevent indexing of the turret during chamfering or while the ram 83 is in its downward position, the movements of the index piston 112 and of the ram pistons 73 and 82 are interlocked. The manner in which this interlocking is attained will now be described with particular reference to the hydraulic diagram of Fig. 16.

The parts are shown in the position where the ram 82 is raised and the indexing operation of the table 46 is about to take place. The pressure fluid is pumped to the various parts from a pump 140 (Fig. 2) which is suitably mounted in the base of the machine and which is driven by a motor 141. The pressure fluid flows through a line 142. The line 142 is connected by a duct 143 with ports 144 of a sleeve 145 in which is mounted a reciprocable valve 146. The line 142 is also connected by a duct 147 with ports 148 of a sleeve 149 in which a valve 150 is reciprocably mounted.

Figure 16:
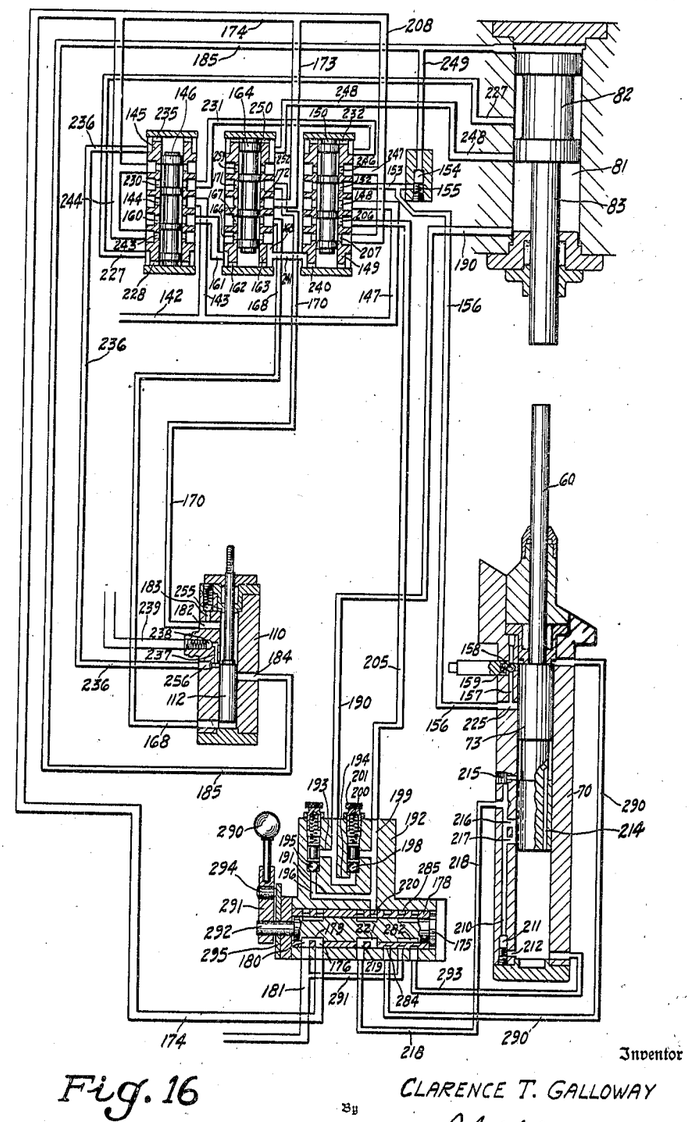
Fig. 16 is a diagrammatic view showing the hydraulic circuit of the machine.

With the valve 150 in the position shown in Fig. 16, the pressure fluid may flow through the ports 148 of sleeve 149 into the ports 152 and through the line 153 to a valve 154, but this valve is normally held closed by a spring 155 and the pressure from the line 153 serves only to seat the valve more securely. Hence, flow of the pressure fluid from the line 153 is stopped at this point. The line 153 is connected, however, with a duct 156 which leads to the cylinder 70. The pressure fluid cannot flow, however, at this time from the duct 156 directly into the cylinder 70 because this duct is closed by the piston 73 which is in its upper position. There is a short duct 157 connected with the duct 156 and leading to the upper end of the piston 73, but this duct is closed by a ball check valve 158 which is pressed into position by a spring 159 and the pressure of the fluid in the line 157 serves only to seat the valve 158 the more securely. Hence at this time the pressure fluid is stopped from flowing from the line 156.

The pressure fluid may flow from the duct 143, however, through the ports 144 of sleeve 145 and ports 160 of this sleeve into a duct 161. This duct connects with ports 162 in the lower end of a sleeve 163 in which a valve 164 is reciprocably mounted. The pressure fluid therefore serves to hold the valve 163 upwardly in the position shown in Fig. 16. The ports 162 of the sleeve 163 communicate through a duct 165, which is formed in the sleeve 163, with the ports 166 of this sleeve. Hence the pressure fluid may flow through the ports 166 and ports 167 into the line 168 which leads to the lower end of the cylinder 110. Thus the piston 112 will be forced from the position shown in Fig. 16 to the position shown in Fig. 7, effecting indexing of the work table.

As the piston 112 is thus moved in the cylinder 110, the fluid on the opposite side of this piston is exhausted through the duct 170, and ports 171 and 172 of sleeve 163 into the line 173 which leads into a line 174. This line 174 connects with the ports 176 of a rotary valve 175. The ports 176 are formed in a sleeve 178 in which the valve is rotatably adjustable. During operation of the machine, the valve 175 occupies the position shown in Fig. 16 and the ports 176 are connected by the grooves 179 of the valve with ports 180 that lead into a duct 181 which leads back to the sump of the machine.

The indexing movement of the piston 112 is dash-potted towards the end of its stroke because the piston 112 will close off the duct 182 which connects with the duct 170 and thereafter further exhaust from the piston is through the check-valve 255 and the duct 183. The duct 183 connects with the duct 182.

When the piston 112 has moved to the limit of its movement in the described direction, it will clear the duct 184 in the side wall of the cylinder 110 and the pressure fluid will now flow from the duct 168 through the duct 184 into the line 185 which leads to the upper end of the cylinder 81. As a consequence, the piston 82 will be moved downwardly in the cylinder 81, thus moving the center 90 and gauge finger 92 into engagement with the pinion which is at the cutting station. This will cause the pinion to be centered up and its tooth spaces to be brought into alignment with the chamfering blades.

During the downward movement of the piston 82, the motive fluid exhausts from the lower end of the cylinder 81 through the line 190. This line communicates with the duct 194 which is drilled in the valve block 192 in which the valve 175 is mounted. The duct 194 leads to a ball check valve 198 which normally closes the opening between the duct 194 and a duct 199. The ball check valve is held normally closed by a coil spring 200 whose tension may be adjusted by a nut 201. This check valve serves to put some back pressure on the line 190 and insure smooth operation of the piston 82 as it moves downwardly.

The duct 199 communicates with a line 205 that connects with the ports 206 of the sleeve 149. With the valve 150 in the position shown in Fig. 16, the exhaust fluid flows from the ports 206 through the ports 207 of sleeve 149 into the line 208 which communicates with the line 174 that leads back to the sump of the machine.

The cylinder 70 is closed to supply when it is in the position shown in Fig. 16, as already described. Moreover, only restricted exhaust from the lower end of the cylinder is possible at this time. The duct 210 which communicates with the interior of the cylinder at the lower end thereof is normally closed by a spring pressed check valve 211. Hence, the exhaust fluid cannot flow from the lower end of the cylinder 70 through the duct 210 because this passage is shut off. There is only one way in which it may flow and that is through ducts 214 of small diameter which are drilled in the piston 73, as shown clearly in Figs. 1 and 16. Further than this, the exhaust fluid has to pass through a needle valve 215 which provides a still more restricted exhaust opening. When the piston 73 is in the upper position shown in Fig. 16, then, exhaust fluid from the lower end of the cylinder can only escape through the needle valve 215. Thence it may flow through the line 218, the ports 219 of sleeve 178, groove 221 of valve 175, and ports 220 of sleeve 178 into the duct 199 whence it may flow through line 205, ports 206 and 207 of sleeve 149 and duct 208 into duct 174 whence it may flow back to the sump.

After the center 90 and gauge finger 92 have engaged the pinion which is at the cutting station, the ram 83 will continue to descend by pressure of the motive fluid on the upper end of the piston 82. The pinion will thus be clamped between the upper ram 83 and lower ram 60. The pressure of the upper ram will then force the lower ram downwardly against the resistance set up by the restricted flow of the exhaust fluid from the lower end of the cylinder 70 through the valve 215. Thus the pinion will be held securely and, as the ram 83 continues to descend, forcing the ram 60 downwardly, the pinion will be forced through the chamfering blades 30 and will be chamfered.

When the lower ram 73 has descended far enough for the ports 216 and 217 in the side wall of cylinder 70 to be exposed, the exhaust fluid in the lower part of the cylinder 70 may exhaust more freely into the duct 210, thus allowing more rapid downward movement of the ram 60. This occurs after the chamfering has been accomplished and at a time when the ram 83 has very nearly reached the limit of its downward movement.

At about this same time, the piston 73 will have descended far enough for the duct 225 leading into the cylinder 70 to be uncovered. Then the pressure fluid flowing from the line 156 exerts its influence on the piston and moves it rapidly downward away from the ram 83. This serves to move the ram 60 downwardly far enough for the pinion to be stripped from the head of this ram by the fingers 101 so that it falls into the chute 102 and is carried away from the machine.

While this is occurring, the ram 82 will have moved far enough so that the piston uncovers the duct 227 leading into the cylinder 81. The pressure fluid flowing into the upper end of the cylinder 81 then passes out through the duct 227 and through the ports 228 of the sleeve 145 into the bottom of the valve 146. This causes the valve 146 to be moved upwardly from the position shown in Fig. 16. The pressure fluid, which has been flowing from the line 143, is thus caused to flow through the ports 144 and 230 into the line 231, whence it flows through the ports 232 of the sleeve 149 to the upper end of the valve 150, forcing that valve downwardly from the position shown in Fig. 16.

The shifting of this valve 150 causes a reversal of the direction of flow of pressure fluid to the cylinder 70. The pressure fluid flowing from the line 147 is now caused to flow through the ducts 148 and 206 into the line 205, whence it flows through the duct 199, ports 220 of sleeve 178, grooves 221 of valve 175, ports 219 of sleeve 178 and duct 218 to the duct 210 in the side wall of the cylinder 70. Thus the check valve 211 is forced open and the pressure fluid enters the bottom of the cylinder 70. At the same time the ducts 157 and 225 in the upper end of the cylinder 70 are put on exhaust through the line 156, ports 152 and 246 of sleeve 149, ducts 247, 208 and 174. Thus the piston 73 is moved upwardly again in the cylinder 70.

During the upward movement of the valve 146, as described, the motive fluid is exhausted from the upper end of this valve through the ports 235, the ducts 236, 256 and 237, and the check valve 238 into the line 239 which leads to the sump. The check valve 238 serves to exert sufficient back pressure to insure smooth operation of the apparatus.

As the valve 150 moves downwardly, as described, the motive fluid is exhausted from the lower end of this valve through the ports 240, the duct 241, the ports 162 of sleeve 163, and either through the duct 165 of this sleeve, the ports 166 and 167 of this sleeve and the line 173 back to the sump, or through the ports 162, line 161, ports 160 and 243 of sleeve 145 and line 244 into the line 174 which goes back to the sump.

When the valve 150 is moved to its lower position, as described, not only does the pressure fluid flow through the line 205, duct 199, and line 218 into the lower end of the cylinder 70, but it also flows from the duct 199, into the duct 196, and thence through the ball check valve 195, duct 193, and line 190 into the lower end of the cylinder 81, thus moving the ram 83 upwardly also. In this upward movement, the motive fluid exhausts from the upper end of the cylinder 81 through the line 185, the duct 249, check-valve 154, duct 153, ports 152 and 246 of sleeve 149 and lines 208 and 174 back to the sump.

Towards the end of the described upward travel of the piston 73, this piston shuts off the duct 225 and thereafter the motive fluid must exhaust through the ball check valve 158. Thereby the speed of upward movement of the piston 173 is retarded to prevent shock when the piston bottoms in the upper end of the cylinder 70.

When the piston 82 has been moved upwardly far enough, it uncovers the line 248, thus permitting the pressure fluid to flow from the line 190 through the line 248 and the ports 250 into the upper end of the sleeve 163 to force the valve 164 downwardly from the position shown in Fig. 16. At the same time the pressure fluid flows from the line 248 through the duct 252, which is cut in the side of the sleeve 163, and the ports 253 and 171 of this sleeve into the line 170. Thence it flows through the check valve 255 into the upper end of the cylinder 110 to force the piston 112 downwardly. Thus the piston 112 is moved back to the right from the position shown in Fig. 7 to reset the index mechanism. As the piston so moves, it uncovers the duct 182 permitting faster flow of the motive fluid into the cylinder 110 so as to achieve accelerated movement of the piston. During the described movement, the motive fluid exhausts from the opposite end of the cylinder 110 through the duct 168, the ports 167 and 172 of the sleeve 163, and the duct 173 into the line 174 which leads back to the sump.

When the piston 112 has moved far enough to uncover the duct 256, the pressure fluid flows from the duct 182 through the duct 256 into the line 236. Thence it flows through the ports 235 in the upper end of the sleeve 145 to return the valve 146 to the position shown in Fig. 16. This puts the line 161 back on supply from the line 143 and causes the valve 164 to be returned to the position shown in Fig. 16. At the same time, it causes the line 241 to be put on supply from the line 161 through the ports 162, causing the valve 150 to be returned to the position shown in Fig. 16. The pressure fluid now flows from the line 161 through the duct 165, and ports 166 and 167 of the sleeve 163 into the line 168. Thence it enters the right hand end of the cylinder 110 (Fig. 7) to move the piston to the left in Fig. 7 and effect the indexing operation again. Thus is initiated the new cycle.

So the operation proceeds. First the work table 46 is indexed by movement of the piston 112 to bring a new pinion into chamfering position. At the end of the movement of this piston the port 184 is uncovered and pressure fluid is supplied through the line 185 to the upper end of the cylinder 81 causing the ram 83 to descend. The center 90 and finger 92 then engage the pinion and center and locate it. The continued descent of the ram 83 causes the pinion to be clamped between the two rams 83 and 60 and the pinion and lower ram 60 are carried downwardly and the pinion is forced through the chamfering blades to chamfer it. The descent of the ram 60 then causes the port 225 to be uncovered and the pressure fluid is then applied to the upper end of the piston 73 from the line 156. This causes the ram 60 with the pinion resting on it, to be carried rapidly away from the ram 83. As the descending ram 60 moves through the fingers 101, the now chamfered pinion is stripped off the ram by the fingers. While this is occurring, the ram 82 will have moved far enough downwardly so that the piston 82 uncovers the duct 227. This allows the pressure fluid to flow from the line 185 into the line 227, causing the valves 146 and 150 to be shifted upwardly and downwardly, respectively, from the positions shown in Fig. 16. This causes reversal of the direction of flow of the pressure fluid to the cylinder 70. It also causes reversal of the direction of flow of the pressure fluid to the cylinder 81. Thus the two rams are moved upwardly again. When they have returned to their upper positions, the line 248 is uncovered and the pressure fluid now flows from the line 190 into the line 248. This causes the valve 164 to be moved downwardly from the position shown in Fig. 16 and the line 170 to be put on supply. Thus the piston 112 is moved to the right (Fig. 7) and the index mechanism is reset. When the piston 112 has moved far enough to uncover the duct 256, then the pressure fluid flows from the line 170 into line 236. This causes valve 146 to be shifted back to the position shown in Fig. 16, causing the valves 164 and 150 to be returned to the positions shown in Fig. 16 also. This reverses the direction of flow of the pressure fluid to the cylinder 110 and the piston 112 is moved to the left (Fig. 7) in the cylinder 110, indexing the work table to bring a new pinion to the cutting station and an empty opening 45 to the loading station. The operator then puts a new pinion in the opening 45.

Figure 8:
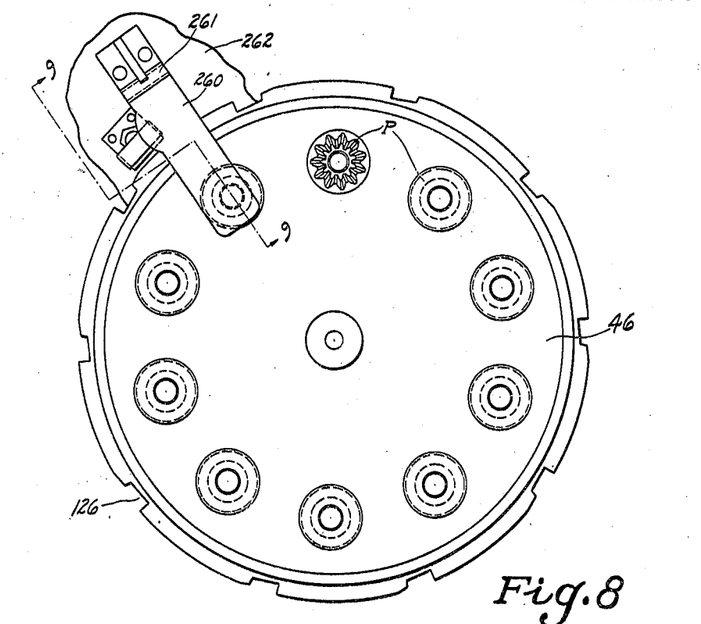
Fig. 8 is a fragmentary view showing the work supporting turret in plan and the device for insuring that the gears, which are to be chamfered, have been positioned correctly in the turret.
Figure 9:
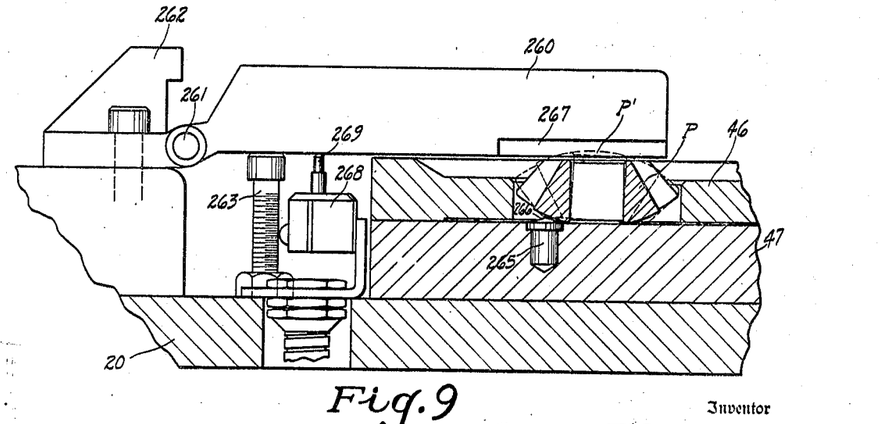
Fig. 9 is a fragmentary sectional view on an enlarged scale on the line 9—9 of Fig. 8, illustrating particularly the operation of the device for insuring correct positioning of the work pieces.
Figures 10, 11, 12, 13, 14, 15:
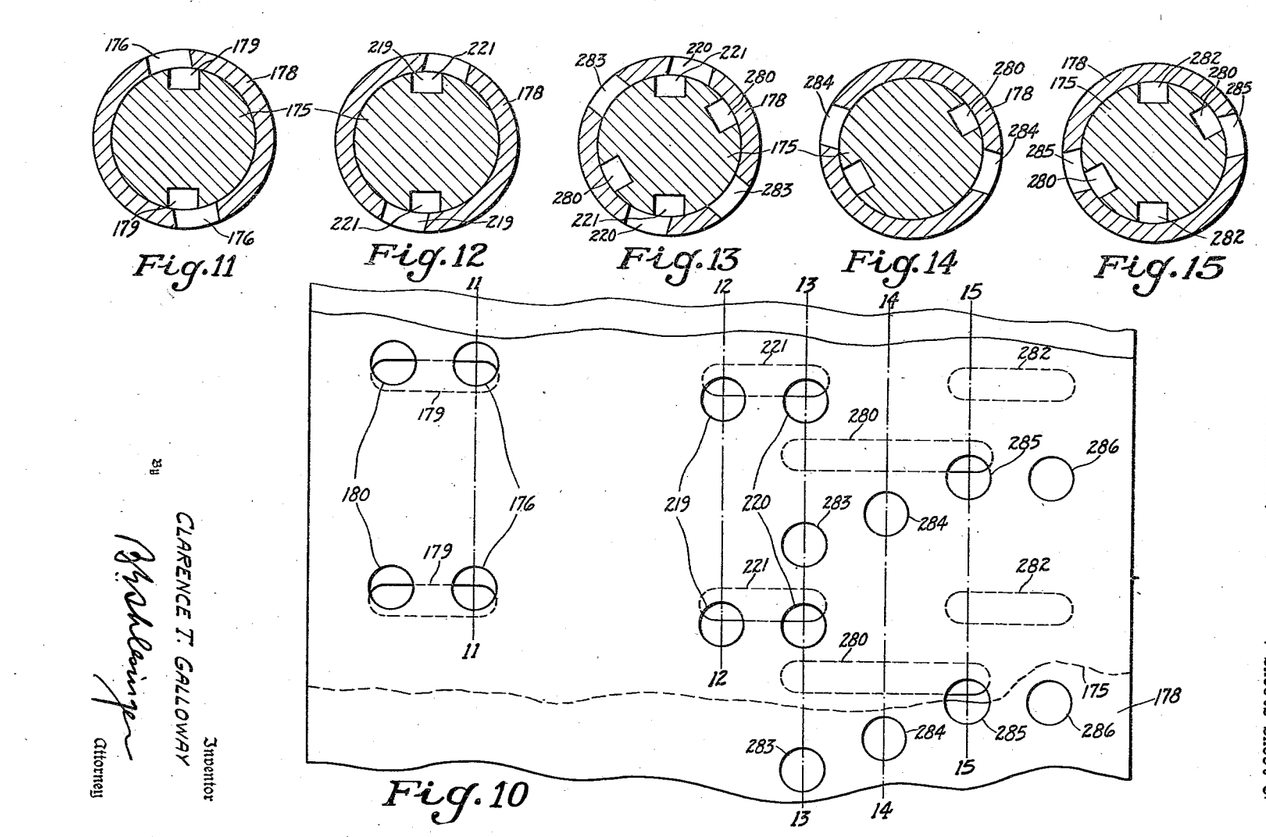
Fig. 10 is a fragmentary developed view of the manually operable control valve for moving the lower ram to and from operative position and of the sleeve in which it rotates.
Fig. 11 is a sectional view through the valve and sleeve, when the parts are in the position shown in Fig. 10, said section being taken in a plane corresponding to the plane 11—11 of Fig. 10.
Figs. 12, 13, 14 and 15 are corresponding views taken in planes corresponding, respectively, to the planes 12—12, 13—13, 14—14 and 15—15 of Fig. 10.

To insure that the operator places the pinions in the openings 45 of the table 46 with the small ends up, a detector device is provided. This comprises an arm 260 (Figs. 8 and 9) which is pivotally mounted by means of a pin 261 on a bracket 262 that is secured to the base 20 of the machine at one side of the table. This arm 260 is long enough to project over the table 46. An adjustable screw 263 is threaded into the base 20 of the machine and the head of this screw is adapted to contact with the under face of the arm 260 so as to hold the arm horizontal with its under face just clearing correctly positioned pinions as the work table is indexed. A pin 265 that has a conical head 266 is secured to the plate 47. The back face of a pinion P that is positioned in the table 46 with its small end up will clear the head 266 of the pinion 265, as shown in full lines in Fig. 9, but if the operator makes a mistake and puts a pinion in an opening 45 of the table 46 with the small end down, then the head 266 of the pin 265 will contact the pinion when the pinion is moved over the pin by indexing of the table. This will cause the pinion to project up far enough, as shown in dotted lines at P' in Fig. 9, to engage the arm 260 and lift this arm upwardly about its pivot pin 261. A limit switch 268 is mounted on the plate 20 so that its plunger 269 is adapted to engage the under face of the arm 260. This is a normally open limit switch and is wired into the starting circuit of the pump drive motor 141 (Fig. 2). As long as the arm 260 is horizontal, the limit switch is held closed so that the circuit to the motor 141 is maintained, but if the arm is lifted upwardly by an inverted pinion, then the limit switch is allowed to open, breaking the circuit to the motor and stopping the operation of the machine. Thus, damage, which might arise in an attempt to chamfer an inverted pinion, is prevented. The arm 260 may be beveled at one side, as indicated at 267, so that it will ride up gradually if a pinion has been put in the table inverted.

It will be noted, from Fig. 1, that the top surfaces of the guide member 64 and of the head 66 are inclined downwardly toward one side of the machine. This is for the purpose of allowing the chips produced in the chamfering operation to fall toward this side of the machine onto a shelf 270, where they may be raked out by a suitable tool inserted through the opening 271 in the side of the machine. Chips falling off of the shelf 270 drop onto the shelf 272 and can be raked off by insertion of a suitable tool through the opening 273 in the base of the machine.

A suitable coolant may be supplied to the points of the cutting blades 30 through a duct 275 (Fig. 4) which communicates with a peripheral grove 276 cut in the tool block 27. Ducts 277 lead from this groove to the tip of each of the cutting blades. The coolant may be supplied from a pump mounted at any suitable point in the base of the machine and driven in any suitable manner, and it may be in sufficient quantity not only to keep the points of the blades cool but also to wash the chips off of them.

Reference has already been made to the manually operable valve 175. This valve occupies the position shown in Figs. 10 to 16 during operation of the machine. In the position of the valve shown in these figures, the grooves 179 in the valve connect the ports 176 and 180 of the valve sleeve 178, while the grooves 221 of the valve connect the ports 219 and 220 of the sleeve 178.

The valve body 175 is also provided with two diametrically opposed grooves 280 which are somewhat elongated as compared with the grooves 221 and 179 and which are displaced angularly about the valve body with reference to the grooves 179 and 221. The valve body is further provided with diametrically opposed grooves 282 which are in longitudinal alignment with the grooves 179 and 221. Besides the ports 220, there are two ports 283 formed in the sleeve 178 in the same plane as the ports 220 and diametrically opposed to one another. Spaced longitudinally from these are two diametrically opposed ports 284. These ports are somewhat slightly displaced angularly from the ports 283. Spaced longitudinally from the ports 284 are ports 285 which are also displaced somewhat angularly from the ports 284. Spaced longitudinally from the ports 285 but in angular alignment therewith are two diametrically opposed ports 286.

The valve is adapted to be rotated by a knob 290 (Fig. 16) which is secured to an arm 291 that is pinned to the stem 292 of the valve. A spring pressed detent 294 which engages in notches in a plate 295 that is secured to the valve housing, serves to hold the valve in any manually adjusted position.

As already described, the valve is shown in Fig. 16 and in Figs. 10 to 15 inclusive in the position which it occupies when the machine is in operation. When it is desired to remove the cutter from the machine, however, as for sharpening, it is necessary to move the ram 60 downwardly until the piston 73 bottoms in the cylinder 70. This is done when the piston 73 is at the lower limit of its normal working range in the cycle of operation of the machine. For this purpose, the operator rotates the valve 175. The grooves 179 of the valve body are thus moved out of registry with the ports 180 and 176 of the sleeve 178, closing off the connection between the lines 174 and 181. At the same time, the grooves 221 are moved out of registry with the ports 219 and 220 closing off the connection between the line 218 that leads to the bottom of the cylinder 70 and the line 205. At the same time, also, the grooves 280 will have moved into position to connect the ports 284 and 285. Thus the line 290 which leads to the upper end of the cylinder 70 is temporarily connected with the line 291. This latter line communicates with the line 181 that leads to the sump of the machine. In the further movement backward of the handle 290, however, the groove 280 in the valve body is moved far enough to connect the ports 283 and the ports 284 and the groove 282 is moved far enough to connect the ports 285 and the ports 286. When the piston 73 is at the lower limit of its normal working range, the valve 150 (Fig. 16) is in its downward position. Hence, when the valve 175 is in position to connect the ports 285 and 286, the upper end of the cylinder 70 will be put on supply from the line 205 through the ports 283, grooves 280, ports 284 and line 290, while the lower end of the cylinder 70 will be put on exhaust through the line 293, the ports 286, the grooves 282, the ports 285 and the line 291 which leads to the sump. Thus the piston 73 will be moved completely downward until it bottoms in the cylinder 70.

When the tool has been removed and a new tool inserted in the machine, the operator swings the handle 290 in the reverse direction so that the grooves 280 are moved out of registry with the ports 283 and are moved into registry with the ports 285 to connect the ports 284 and 285. This puts the upper end of the cylinder 70 on exhaust through the line 290, ports 284, grooves 280, ports 285, line 291, and line 181. At the same time, the grooves 282 move out of registry with the ports 285 and 286 to close the line 293 leading from the bottom of the cylinder 70. In the further movement of the valve 175 to operative position, the grooves 179 are returned into registry with the ports 180 and 176, and the grooves 221 are returned into registry with the ports 219 and 220 to the position shown in Figs. 10 to 16 inclusive. Thus the lines 218 and 190 leading to the lower ends of the cylinders 70 and 81 are put back on supply and the pistons 73 and 82 are moved upwardly causing the machine to resume its normal operative functions.

While the invention has been described particularly in connection with the chamfering of the teeth of straight bevel gears, it will be obvious that it may be applied to the chamfering of the teeth of other types of gears also. In general it may be said that while the invention has been illustrated in connection with a particular embodiment thereof, it is capable of still further modification, and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A machine for chamfering gears comprising a tool having a plurality of cutting blades equal in number to the tooth spaces of the gear to be chamfered and arranged radially of a common axis, a work support adapted to hold the gear so that its axis is in alignment with the axis of the tool, means for reciprocating the work support to pass the teeth of the gear through the cutting blades of the tool, and relatively fixed means arranged beyond the tool and operable on the cutting stroke of the work support to strip the gear from the work support after it has been chamfered.

2. A machine for chamfering gears comprising a relatively stationary tool having a plurality of cutting blades arranged radially of a common axis, an upper and a lower ram mounted to reciprocate along said common axis, means for reciprocating said rams, and means for controlling their reciprocating movements so that they are first moved toward one another to effect clamping of the gear, then are moved in one direction to pass the teeth of the gear across the tool, are then separated to permit removal of the chamfered gear, and are then returned to starting position.

3. A machine for chamfering gears comprising a relatively stationary tool having a plurality of cutting blades arranged radially of a common axis, an upper ram and a lower ram mounted to reciprocate along said common axis, means for reciprocating the rams, means for controlling the movements of the rams so that they are first moved toward one another to clamp a gear between them, then are moved in one direction to pass the teeth of the gear through the cutting blades of the tool, are then separated and the lower ram is moved on further in the described direction, and are then reversed to return to original positions, and means operative during the extended movement of the lower ram to strip the chamfered gear from the lower ram.

4. A machine for chamfering gears comprising a base, a relatively stationary tool mounted in the base, an upper ram and a lower ram mounted in alignment for reciprocation in the base, means for reciprocating the upper ram, means for reciprocating the lower ram, means for timing the two reciprocating movements so that the upper ram first moves towards the lower ram to effect clamping of a gear between them, then the continued movement of the upper ram causes the gear and the lower ram to be moved in the direction of movement of the upper ram to pass the teeth of the gear across the tool to effect chamfering, then the lower ram and gear are moved away from the upper ram a predetermined distance, and then both rams are returned to their initial positions, and means for stripping the chamfered gear from the lower ram when the lower ram moves away from the upper ram.

5. A machine for chamfering gears comprising a base, a relatively stationary tool mounted in the base, an upper ram and a lower ram, hydraulically operated means for reciprocating the two rams, valve-means for controlling the movements of the two rams so that pressure is first applied to the upper ram to move it in one direction to clamp a gear between the two rams and the gear and lower ram are then moved by the upper ram to pass the gear across the tool, then pressure is applied to the lower ram to move it away from the upper ram, and then the direction of flow of the pressure fluid to the two rams is reversed to return both to starting position, and means for stripping a chamfered gear from the lower ram when the lower ram moves away from the upper ram.

6. A machine for chamfering gears comprising a base, a work support, a tool support, a tool mounted on the tool support having a plurality of cutting blades which are arranged radially of a common axis and have side cutting edges complementary to the sides of the gear to be chamfered, means for effecting relative reciprocating movements between the tool and work support along the axis of the tool to effect the chamfering operation, a work holder rotatably mounted on the base and adapted to hold a plurality of gears, and means for indexing the work holder once for each relative reciprocation of the tool and work support to bring a new gear to the work support for chamfering.

7. A machine for chamfering gears comprising a base, a work holder rotatably mounted on the base and adapted to hold a plurality of gears, means for indexing the work holder to move the gears step by step from a loading station to a cutting station, a cutting tool mounted at the cutting station having a plurality of cutting blades which are arranged radially of a common axis and which have side cutting edges approximately complementary in profile shape to the sides of the teeth of the gear to be chamfered, means for effecting a relative reciprocatory movement between the cutting tool and a gear, when the gear reaches the cutting station, to effect chamfering of the gear, and means for actuating the index mechanism, after each relative reciprocatory movement, to bring a new gear to the cutting station.

8. A machine for chamfering gears comprising a base, a work holder rotatably mounted on the base and adapted to hold a plurality of gears, means for indexing the work holder to move gears step by step from a loading station to a cutting station, a cutting tool mounted at the cutting station having a plurality of cutting blades which are arranged radially of a common axis and which have side cutting edges approximately complementary in shape to the sides of the gear to be chamfered, a work support to which a gear is transferred by the movement of the work holder when the gear reaches the cutting station, means for precisely positioning the gear on the work support at the cutting station, and means for reciprocating the work support relative to the tool to effect chamfering.

9. A machine for chamfering gears comprising a base, a cutting tool mounted on the base, a stripping member mounted on the base, a work table rotatably mounted on the base and having a plurality of openings therein to hold a plurality of gears, means for indexing the work table to move gears step by step from a loading station to the cutting station, a work support reciprocably mounted in the base and positioned to receive a gear when it reaches the cutting station, a positioning member mounted on the base to be in alignment with the work support, means for reciprocating said positioning member, and means for controlling the movements of the positioning member and work support so that the positioning member is moved down through that opening of the work table, which is at the cutting station at a given time, to clamp a gear on the work support and to move the work support downwardly to pass the gear across the cutting tool and past the stripping member, and then return the work support and the positioning member to initial position, and means for indexing the work table when the positioning member has returned to initial position clear of the table.

10. A machine for chamfering gears comprising a base, a cutting tool mounted on the base having a plurality of cutting blades arranged radially of a common axis and having side cutting edges approximately complementary in shape to sides of the teeth of the gears to be chamfered, a work holder rotatably mounted on the base and adapted to carry a plurality of gears, means for indexing the work holder periodically to move gears step by step from a loading station to a cutting station, reciprocable means for moving a gear, when it reaches the cutting station, past the cutting tool to effect chamfering of its teeth, means operative after each reciprocating movement is completed, to actuate the indexing means, and means operative after each indexing operation is completed, to actuate the reciprocable means.

11. A machine for chamfering gears comprising a cutting tool, a work holder adapted to carry a plurality of gears, means for indexing the work holder to move gears step by step from a loading to a cutting station, a cutting tool at the cutting station, means for effecting a relative movement between the cutting tool and the gear at the cutting station to chamfer the teeth of the gear, a stationary member mounted beneath the work holder in such position as to engage one end of a gear carried by the work holder if the gear is incorrectly positioned on the work holder and to move said gear outwardly, a movable contact member mounted at the opposite side of the work holder in position to engage the opposite end of any gear so moved outwardly, and means operable, when said contact member engages a gear, to stop the operation of the machine.

12. A machine for chamfering gears comprising a base, a tool support fixedly mounted in the base, a tool mounted on said support and having a plurality of cutting blades arranged radially of a common axis and having side cutting edges approximately complementary to teeth of the gear to be chamfered, a work support mounted on said base for reciprocation along said common axis, and a positioning member also mounted on said base for reciprocation along said common axis and provided with a center adapted to enter the bore of a gear to be chamfered and with a finger adapted to enter a tooth space of the gear to locate the gear correctly on the work support, means for actuating said positioning member to effect location of the gear, and means for thereafter actuating the work support to pass the gear across the tool to chamfer its teeth.

13. In a gear cutting machine, a tool, a rotary work holder having a plurality of work-receiving openings, a finger arranged at each work-receiving opening to enter a tooth space of a gear blank that is positioned in said opening to position the gear blank roughly in the opening, means for indexing the work holder to move work pieces successively from a loading station to a cutting station, and means arranged at the cutting station to position a gear blank precisely in each opening, and means for automatically bringing the last named means into operative engagement with each gear blank when the gear blank is indexed to the cutting station.

14. In a gear cutting machine, a tool, a rotary work holder having a plurality of work-receiving openings, a finger arranged at each work-receiving opening to enter a tooth space of the gear blank that is positioned in said opening to position the gear blank roughly in the opening, means for indexing the work holder to move the gear blanks successively from a loading station to a cutting station, a ram member having a center formed thereon adapted to enter the bores of the gear blanks, a finger secured to said ram member and adapted to enter a tooth space of a gear blank, and means for automatically actuating said ram to move the center and the last-named finger into engagement with a gear blank to position the blank precisely in an opening of the work holder when the blank reaches the cutting station.

15. In a gear cutting machine, a base, a work holder rotatably mounted on the base and provided with a plurality of openings adapted to receive a plurality of gear blanks, a stationary plate disposed beneath said work holder to prevent work pieces from dropping through said openings, means for indexing the work holder to move the work pieces successively from a loading to a cutting station, said plate having an opening therein at the cutting station of sufficient size to permit a gear blank to pass freely therethrough, and means aligned with the opening in the plate to support a gear blank during the cutting thereof.

16. In a gear cutting machine, a base, a work holder rotatably mounted on the base and provided with a plurality of openings adapted to receive a plurality of gear blanks, a stationary plate disposed beneath said work holder to prevent work pieces from dropping through said openings, means for indexing the work holder to move gear blanks successively from a loading to a cutting station, said plate having an opening therein at the cutting station of sufficient size to permit a gear blank to pass freely therethrough, means aligned with said opening to support a gear blank during the cutting thereof, said last named means being reciprocable, a tool mounted in stationary position beneath the opening in said plate, and a reciprocable ram for forcing the gear blank, which is at the cutting station, and said supporting means downwardly to pass the gear blank by the tool.

17. In a gear cutting machine, a rotary work holder adapted to carry a plurality of gear blanks, means for indexing the work holder to move the blanks successively from a loading station to a cutting station, a member mounted on a relatively fixed part of the machine to engage each work piece as the work holder is rotated and adapted to move a blank outwardly if it is incorrectly positioned in the work holder, a movable member arranged above said work holder in position to contact with and be moved by any blank that is moved outwardly, and means operable on movement of the last named member to stop the machine.

CLARENCE T. GALLOWAY.